J. L. MONTGOMERY.
WRITING POSITION AND MOTION TRAINING CARD.
APPLICATION FILED FEB. 21, 1911.
1,006,393.
Patented Oct. 17, 1911.
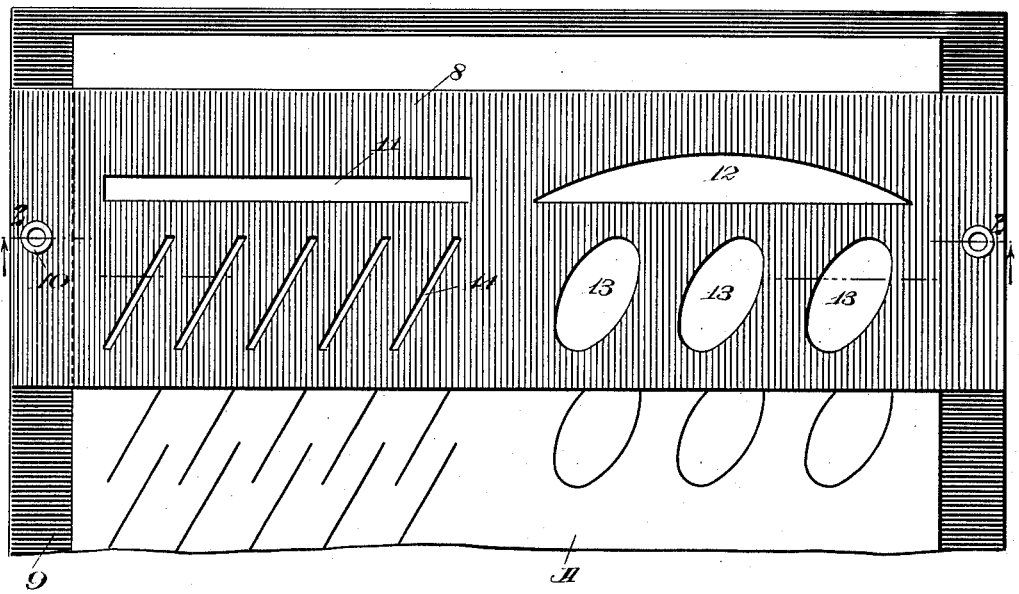
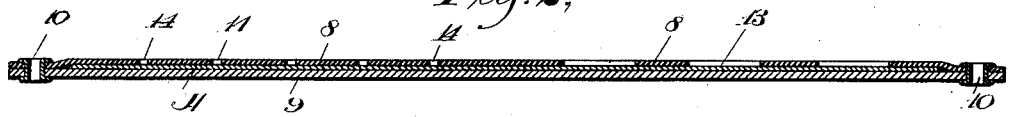
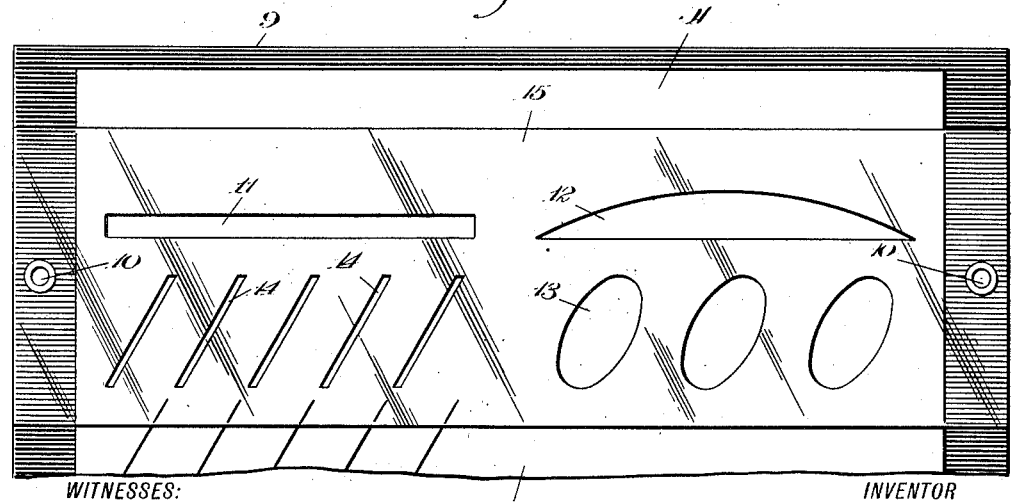
WITNESSES:
Edward Thorpe.
INVENTOR
James L. Montgomery
BY
ATTORNEYS

UNITED STATES PATENT OFFICE.

JAMES L. MONTGOMERY, OF MOUNT VERNON, NEW YORK.

WRITING POSITION AND MOTION TRAINING CARD.

1,006,393.  Specification of Letters Patent.  Patented Oct. 17, 1911.

Application filed February 21, 1911. Serial No. 610,063.

*To all whom it may concern:*

Be it known that I, JAMES L. MONTGOMERY, a citizen of the United States, and a resident of Mount Vernon, in the county of Westchester and State of New York, have invented a new and Improved Writing Position and Motion Training Card, of which the following is a full, clear, and exact description.

Among the principal objects which the present invention has in view are: to provide a card of the character named with openings or stencil forms arranged to control the movement of an inscribing pencil; and to form a paper guide and paper rest to control and facilitate the formation of the marks, the repetition whereof, it is found, trains the hand and arm of students of chirography.

One embodiment of the present invention is disclosed in the structure illustrated in the accompanying drawings, in which like characters of reference denote corresponding parts in all the views, and in which—

Figure 1 is a side view of a card constructed and arranged in accordance with the present invention; Fig. 2 is a cross section of the same taken on the line 2—2 in Fig. 1; and Fig. 3 is a view similar to Fig. 1, showing an alternative form of the card employed in the present invention.

As seen in the drawings, a stencil card 8 is secured rigidly to a back 9 by means of suitable paper fastening eyelets. It will be understood that the eyelets may be substituted by any form of fastening device. The stencil card 8 is provided with slots or openings 11, 12, 13 and 14. The openings 11 and 12 are elongated, as shown, to compel the free arm movements forming the base of the writing position and motion. The disposition of the openings 11 and 12 is such that the hand of the writer is supported on the nails of the third and fourth fingers, while resting on the sheet of paper A, and not upon the surface of the stencil card 8.

In the development of the training it will be noted that the opening 11 is devoted for the formation of straight line motion only, whereas the opening 12 can be utilized for combining the outward curve stroke and the return straight stroke, both strokes being, however, imparted by the forearm of the writer. The openings 13 are for training the forearm in the approved motion used in forming ovals. The openings 14 are for training the forearm to form the oblique straight lines used in writing. The openings 14 are formed in serial arrangement, as shown, and inclined to the natural or common slant of the lines used in the writing for which the card is provided. The openings 13 are given an oval shape, containing the essentials of all the curved lines used in the formation of round characters.

It will be noted that the stencil card 8 forms a guide for the paper A, which, when in operative position, is inserted below the card 8, as shown in the drawings. The student, when employing the aid of the card, shifts the paper A from time to time, using the successive spaces for marking, and showing thereby the extent of the practice to which he has devoted his time.

In Fig. 3 of the drawings the modified form of the structure consists in employing a transparent card 15. The openings 11, 12, 13 and 14 formed in the card 15 are the same as illustrated in Fig. 1 of the drawings. In the employment of the transparent card, such as for instance formed from celluloid, the advantages to the student is that he can see the relation of the lines formerly placed upon the paper A to the lines which he intends to place.

It has been found that the employment of a card of this character has facilitated the teaching of chirography to a large degree. It is further found that by the employment of the card, together with the sheet of paper A, where the student is supposed not to mark one line over another the extent of the practice to which he has devoted his time may be ascertained.

Having thus described my invention, what I claim as new and desire to secure by Letters Patent is:—

1. As an article of manufacture, a training card having a stencil section, and a back for supporting the paper, said stencil section and back being rigidly secured at the lateral edges.

2. As an article of manufacture, a training card having a stencil section, and a back for supporting the paper, said stencil section and back being rigidly secured at the lateral edges to form a guide opening for the paper between the said stencil section and back.

3. As an article of manufacture, a training card having a paper supporting back and a transparent stencil section rigidly secured thereto and at the lateral edges thereof, said section having formed therein opening to compel the path of a practicing pencil to travel in defined basic chirography lines.

4. As an article of manufacture, a training card having a back for supporting paper and a stencil section rigidly secured thereto at near the top thereof, said stencil section being narrow in form to avoid contact with the fingers of the student.

In testimony whereof I have signed my name to this specification in the presence of two subscribing witnesses.

JAMES L. MONTGOMERY.

Witnesses:
E. F. MURDOCK,
PHILIP D. ROLLHAUS.